Dec. 24, 1940.   H. O. DROTNING   2,226,161
PHOTOGRAPHIC CAMERA
Filed March 11, 1938
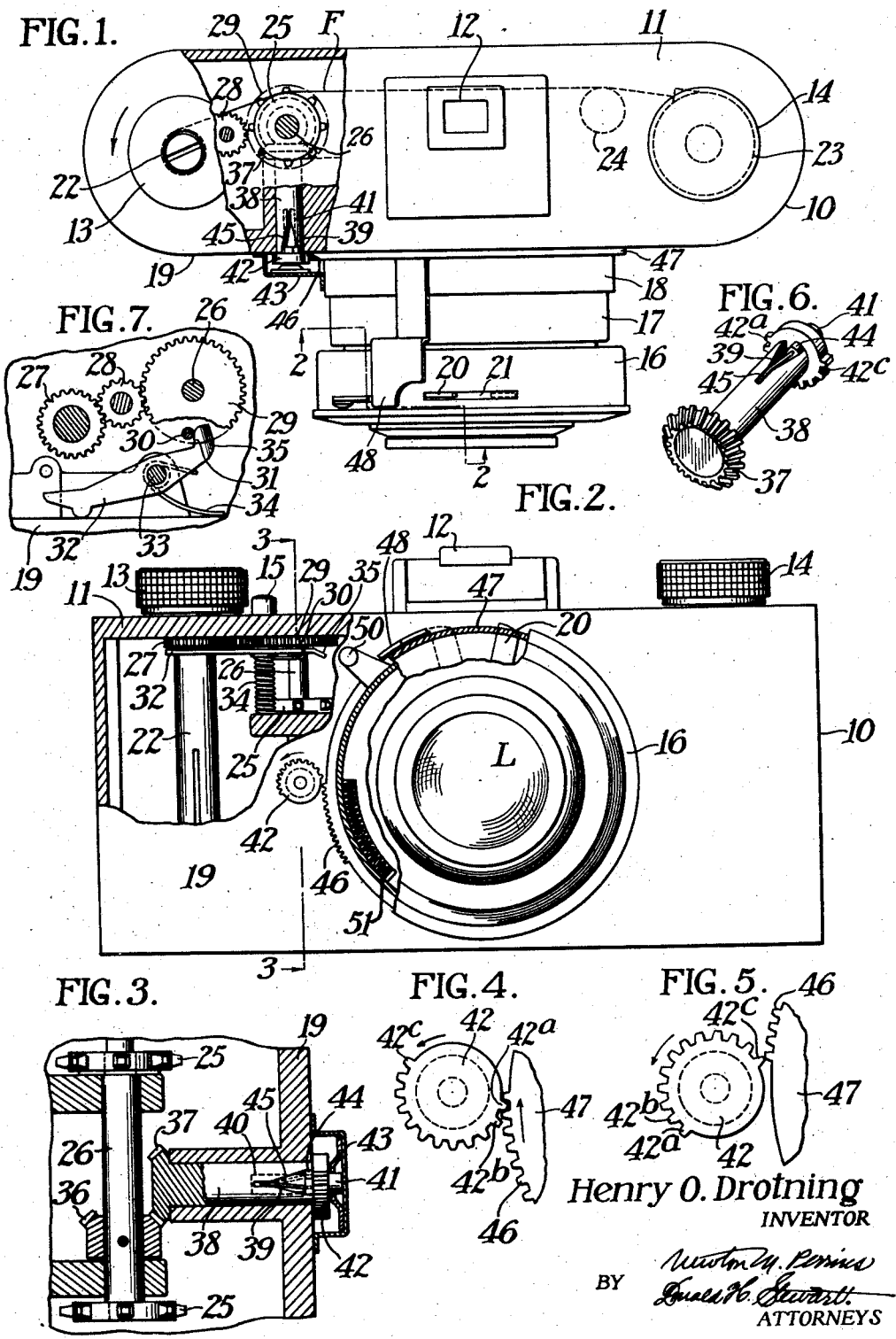
Henry O. Drotning
INVENTOR
BY
ATTORNEYS Patented Dec. 24, 1940

2,226,161

UNITED STATES PATENT OFFICE 2,226,161

PHOTOGRAPHIC CAMERA

Henry O. Drotning, Rochester, N. Y., assignor to Eastman Kodak Company, Rochester, N. Y., a corporation of New Jersey Application March 11, 1938, Serial No. 195,331

5 Claims. (Cl. 95—31)

This invention relates to photographic cameras, and more particularly to mechanism for simultaneously advancing the film and winding the shutter. A principal object of the invention is the provision of means whereby so-called "double exposures" are rendered impossible. Another object is to provide an arrangement of the film and shutter controls that is convenient and rapid to operate. Other objects and advantages will appear in this specification, and will be understood by reference to the accompanying drawing, in which:

Fig. 1 is a top plan of a camera embodying the present invention, a part being broken away to show interior details;

Fig. 2 is a front elevation of the same camera, a part being broken away also to show certain interior details, the sectional plane being approximately on line 2—2 of Fig. 1;

Fig. 3 is a detail section, through the line 3—3 of Fig. 2;

Figs. 4 and 5 are front views of a part of the shutter winding mechanism;

Fig. 6 is a perspective view of the parts associated with the gears shown in Figs. 4 and 5; and Fig. 7 is a plan view, taken just below the top wall of the camera, and showing the gear connection between the winding knob and the film advancing sprocket.

The camera shown in the drawing is of the "miniature" type, and the lens assembly is mounted in a tube attached to the camera body. The invention, however, is applicable to any type of camera and is not necessarily confined to this type.

As illustrated, the camera body 10 has a top wall 11 on which the usual control elements may be mounted, such as a view finder 12, a film winding knob 13, a rewind knob 14, and a film release button 15. The lens L is carried as usual, with the shutter, in a casing 16 that is mounted on a tube 17 fixed in a ferrule 18 on the front wall 19 of the camera body 10.

The shutter is of the type which has to be "set" or "wound" before making an exposure, and is therefore provided with a winding lever 20, movable laterally in a slot 21. This lever is purposely proportioned so that it projects only slightly above the shutter casing 16 and it is difficult and impractical for the operator to move the lever by direct manual contact. Therefore, other means are provided, which must be operated in conjunction with the advancement of the film strip.

The winding knob 13 is mounted on the camera at the upper end of the film spool 22, and perforated film from a supply cassette 23 passes over an idler roller 24 and across the usual exposure aperture, thence over sprockets 25 on a shaft 26 and to the spool 22. The knob 13 may be lifted or pulled outwardly from the top wall 11 or unclutched from the spool to disengage it from the spool 22, so that the film may be rewound into the cassette 23 by turning the knob 14. A suitable ratchet holds the knob 13 against movement in the unwinding direction, so that it may move only in the direction indicated in Fig. 1. This ratchet, and also the clutch between the knob 13 and the spool 22, are not shown in the drawing, as they are well known in cameras of this type, and form no part of the present invention. A suitable slip clutch is provided between gear 27 and spool 22, and as such clutches are well known in the art it is not shown in the drawing.

On the spool 22 is a gear 27, meshing through a pinion 28, with a gear 29 on the sprocket shaft 26. The sprockets 25 are so proportioned that one revolution thereof will advance the film F the length of one "frame." When the knob 13 is turned in the direction of the arrow, the gear 29 is revolved in the same direction, and a pin 30 on the bottom of said gear strikes a hooked end 31 of a detent lever 32 and stops. The detent 32 is pivoted at 33 and is urged counterclockwise (Fig. 7) by a spring 34, its outer end being stopped by the front wall 19 of the camera. The gear 29 cannot be rotated further, and therefore the sprockets 25 cannot advance the film F to the next frame until the end 31 of detent 32 is disengaged from the pin 30. This disengagement is accomplished by pressing downwardly on the button 15, (which is coaxial with the pivot 33) against the spring 34. It will be noted that the latter is a torsion spring, to hold the detent 32 in the position shown in Fig. 7, and is also a compression spring which tends to elevate said detent into the path of pin 30.

When the gear 29 revolves clockwise, in the rewinding operation, pin 30 rides up an inclined portion 35 on detent 32, the latter being depressed momentarily until the pin slips off the portion 31.

Fixed to the sprocket shaft 26 is a miter gear 36, which meshes with a mating miter gear 37. The latter is integral with a stub shaft 38 that projects through the front wall 19. The outer end of shaft 38 has a V-shaped cleft 39, and a bore 40 in which one end of a pintle 41 is supported and freely revoluble. The pintle 41 carries a mutilated pinion 42 and the outer end of the pintle is supported in a housing 43 attached to camera wall 19. On the back of pinion 42 and integral with it is a boss 44, narrower than the wide end of the V-cleft 39, and in this boss the ends of a U-shaped wire spring 45 are anchored.

The opposite arms of spring 45 are inclined to the axis of the pintle 41 in opposite directions (Fig. 3), so that the boss 44 is biased toward one side of the V-cleft 39. If the pinion 42 is rotated clockwise (Fig. 2) the spring 45 will be twisted, but will return the pinion 42 to its initial position when the force acting on the pinion is removed.

The gear 42 is so located that it may be caused to mesh with a segmental gear 46 on the periphery of a ring 47. This ring is revolubly mounted on the lens tube ferrule 18 and has an arm 48 projecting forwardly over the lens tube 17 and the shutter case 16. The arm 48 is so designed that when the segmental gear 46 is moved clockwise its full length, the arm 48 will strike the winding lever 20 of the shutter and move it from the released position, indicated by broken lines in Fig. 2, to the wound up or set position, as shown in full lines in Fig. 2, thus placing the shutter in condition for release by the trigger 50 to make an exposure. The ring 47 and the segmental gear 46 are constantly urged counter clockwise by a spring 51, so that the arm 48 will be restored to the position shown in Figs. 1 and 2 unless otherwise restrained.

The operation cycle of the camera is begun by the turning of winding knob 13 in the direction indicated. This movement, carried through gears 27, 28 and 29, turns sprockets 25 and so moves the film F until pin 30 strikes the portion 31 of detent lever 32. The film then can move no further unless the detent 32 is depressed.

As soon as knob 13 is turned to advance the film, the miter gears 36 and 37 rotate the pinion 42 in the direction indicated in Fig. 2, and the first tooth 42ª of the pinion engages the segmental gear 46 between the two upper teeth thereof, as in Fig. 4. The pinion 42 continues to revolve and as the segmental gear 46 and the arm 48 move clockwise, the latter winds the shutter to the latched position by contacting the lever 20 as before described. Just as the lever 20 becomes latched, the last tooth 42ᶜ of the pinion turns past the lowermost tooth of the gear 46 and the untoothed portion of the pinion comes into the arc of said gear (Fig. 5). As there are then no teeth to mesh with the gear 46, the spring 51 immediately returns the ring 47 to the position of Fig. 2. The spring 45, having been twisted during its driving movement, to the opposite sides of the V-cleft 39 from those with which it is shown in contact, namely, to the broken-line position indicated in Fig. 3, immediately snaps the pinion 42 out of the path of the gear teeth 46.

The continued turning of the winding knob 13 brings the pin 30 against the detent shoulder 31, and completes the movement of a fresh area of film into exposing position. This movement also completes a revolution of the pinion 42, restoring it to the position of Fig. 4, where, as shown, the tooth 42ª has entered between the two uppermost teeth of the gear 46 and has moved the latter a very little way clockwise.

If now the camera operator trips the shutter by pressing trigger 50, thus making an exposure, he may wind another fresh area of film onto spool 22 by again turning knob 13. If he forgets to wind the film, he cannot make another exposure, because shutter setting lever 20 can be moved only by the arm 48, and the latter may only be moved by the engagement of the pinion 42 with the gear 46, and this will occur only during a full revolution of the sprockets 25 as they are driven through the rotation of knob 13.

If the operator should attempt to set the shutter by manually turning the ring 47 he would find it impossible, because the "geared-up" resistance through all the gears 42, 37, 36, 29, 28 and 27 is so great that more power would be required to turn these parts than can be applied with the fingers to the ring 47 or to the arm 48. The pinion 42 in this case tends to jam against the gear 46 and, in effect, to lock the latter against movement. It is thus impossible to make more than one exposure on any frame of film.

I claim:

1. In a camera for holding perforated roll film, having spaced film chambers and a manually-operated film transport mechanism including a sprocket, the combination of a shutter provided with an operating lever, connections for transmitting the movement of the sprocket to the operating lever including a mutilated gear, a gear connected with the operating lever and adapted to mesh with the mutilated gear, and a spring means between the movement transmitting connections and tending to turn the mutilated gear whereby the latter is unmeshed from the operating lever gear after a predetermined movement of the operating lever.

2. In a camera for holding perforated roll film, having spaced film chambers and a manually-operated film transport mechanism including a sprocket, the combination of a shutter, an operating member for the shutter including a gear, gearing between the sprocket and the operating member, a mutilated gear adapted to engage said operating member, a shaft coaxial with the mutilated gear, and a lost motion connection between said shaft and said mutilated gear comprising a V-shaped notch in the shaft having a spring anchored therein, the free end of the spring engaging the mutilated gear and tending to turn said gear, whereby the latter is returned to a definite position after passing out of engagement with the operating member gear.

3. In a roll holding camera, the combination with a camera body including spool chambers for spools and perforated film, of a sprocket over which the perforated film passes, a setting shutter, an operating member for setting the shutter, means for moving the operating member for setting the shutter, including a pair of gears which are adapted to mesh at least one of which is mutilated, and connections between the mutilated gear and the sprocket including a notched shaft, a spring member engaging the sides of said notch and the mutilated gear, said spring being biased to tend to rotate the mutilated gear in the direction toward which said gear moves during the shutter-setting operation.

4. In a roll holding camera, the combination with a camera body including spool chambers for spools and perforated film, of a sprocket over which the perforated film passes, a setting shutter, an operating member included in the setting shutter, means for moving the operating member for setting the shutter, gearing including a pair of gears which are adapted to mesh at least one of which is mutilated, and connections between a mutilated gear and the sprocket including a shaft, notched to form a V-shaped opening in one end, a spring member having spaced arms anchored at one end to said mutilated gear and at the other end in the crotch of the V-shaped opening, said arms normally lying adjacent one wall of the V-shaped opening but capable of flexing to the other side thereof, means for turning the sprocket and thereby transmitting motion to the mutilated gear through the spring by tensioning said spring arms, whereby said spring arms may turn said mutilated gear to clear the teeth from the gear with which it may mesh after said sprocket has been wound.

5. In a camera for holding perforated roll film, having spaced film chambers and a manually-operated film transport mechanism including a sprocket, the combination of a shutter, an operating member for the shutter movable in one direction by an operating member spring and in another direction manually, driving connections between the sprocket and the operating member including a mutilated gear engaging said operating member, and a spring acting upon the mutilated gear tending to turn the mutilated gear, whereby the latter may drive the operating member in one direction until the teeth of the mutilated gear slip off from the teeth of the separating member whereby the mutilated gear may be turned clear thereof by the action of the spring to permit said operating member to be moved in another direction by an operating member spring.

HENRY O. DROTNING.